US006824287B2

(12) United States Patent
Moon

(10) Patent No.: US 6,824,287 B2
(45) Date of Patent: Nov. 30, 2004

(54) FLAT TYPE FLUORESCENT LAMP

(75) Inventor: Jeong-Min Moon, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 59 days.

(21) Appl. No.: 10/000,093

(22) Filed: Dec. 4, 2001

(65) Prior Publication Data

US 2002/0070660 A1 Jun. 13, 2002

(30) Foreign Application Priority Data

Dec. 7, 2000 (KR) ........................................ P2000-74288

(51) Int. Cl.⁷ ................................................ F21V 9/16
(52) U.S. Cl. ........................ 362/84; 362/223; 362/260; 362/330; 313/292
(58) Field of Search .......................... 362/31, 390, 84, 362/260, 223, 330, 433, 26; 313/483, 292, 495–496, 238, 250, 485, 257, 254, 422, 482, 258, 274; 349/60, 64, 155; 445/24–25

(56) References Cited

U.S. PATENT DOCUMENTS

| | | | | | |
|---|---|---|---|---|---|
| 5,561,343 | A | * | 10/1996 | Lowe .......................... | 313/482 |
| 5,811,927 | A | * | 9/1998 | Anderson et al. ........... | 313/495 |
| 5,859,508 | A | * | 1/1999 | Ge et al. ..................... | 315/366 |
| 5,914,560 | A | * | 6/1999 | Winsor ........................ | 313/493 |
| 6,474,825 | B1 | * | 11/2002 | Saito et al. .................... | 362/31 |
| 2002/0044437 | A1 | * | 4/2002 | Lee .............................. | 362/31 |

* cited by examiner

Primary Examiner—Alan Cariaso
Assistant Examiner—Guiyoung Lee
(74) Attorney, Agent, or Firm—Morgan, Lewis & Bockius LLP

(57) ABSTRACT

A flat type fluorescent lamp can include supporters between a first substrate and a light-scattering means. The flat type fluorescent lamp can also include first and second substrates, a light-emitting layer disposed between the first and second substrates, a plurality of supporters selectively arranged on the first substrate, and a light-scattering layer placed above the plurality of supporters, wherein the light-scattering layer is spaced a distance from the first substrate.

23 Claims, 4 Drawing Sheets

FLAT TYPE FLUORESCENT LAMP

This application claims the benefit of Korean Application No. P2000-74288, filed in Korea on Dec. 7, 2000, which is hereby incorporated by reference.

BACKGROUND OF THE INVENTION

1. Field of the Invention

The present invention relates to a flat type fluorescent lamp, and more particularly, to a flat type fluorescent lamp that is applicable to a backlight and a flat light source of a liquid crystal display (LCD) device.

2. Background of the Related Art

Recently, research of flat panel displays has been actively pursued. Especially, flat panel displays such as liquid crystal display (LCD) devices, field emission displays (FLD), electro luminescence displays (ELD), and a plasma display panels (PDP) have attracted considerable attention. Among the flat panel displays, which are unlike light-emitting flat panel displays, the LCD device does not emit light. Thus, a picture display cannot be viewed in the LCD device without a light.

In order to solve this problem, a separate light source, such as a backlight, is formed in a lower portion of a liquid crystal panel to uniformly irradiate light into a display panel. The back light assembly may be classified as either an edge light type or a direct type. In the direct type back light assembly, a fluorescent lamp is mounted in a lower portion of a liquid crystal panel, and a light-diffusion plate is mounted between the fluorescent lamp and the liquid crystal panel. In the edge light type back light assembly, light generated from the fluorescent lamp mounted at the side of the liquid crystal panel is distributed over the entire LCD screen using a transparent light-guiding plate. Recently, a flat type has been proposed that can uniformly irradiate light. In the flat type back light assembly, a phosphor layer is deposited on inner surfaces of the upper and lower substrates on opposing surfaces of the liquid crystal panel, and then electrodes are selectively mounted.

Large-sized display panels require a light source that irradiates uniform light. Flat type back light assemblies are best suited for this application.

A related art flat type fluorescent lamp is described below with reference to the accompanying drawings. Generally, as shown in FIG. 1, the flat type fluorescent lamp includes a reflecting portion 1, a light-emitting portion 2, and a light-diffusion portion 4. In an LCD device, the liquid crystal panel is formed above the light-diffusion portion 4. Herein, the reflecting portion 1 reflects light that is emitted away from the liquid crystal panel back toward the liquid crystal panel.

The light-diffusion portion 4 includes a light-scattering means for scattering the light preventing the reflecting portion 1 from reflecting the shape of a lamp onto the display panel. For example, the light may be very intense where the light-emitting portion of the lamp is located, while the remaining portions, situated away from the lamp, may be relatively dark. As a result, the shape of the lamp is reflected on the display panel. Accordingly, the light-scattering means is used to prevent the shape of the lamp from being reflected on the display panel, and to uniformly distribute a given quantity of light. The light-scattering means 5 includes one or more light-scattering medium layers. Sometimes a sheet is formed on the light-scattering means to enhance display quality and improve characteristic of light.

As the display area increases, the light-emitting area of the backlight also increases. In accordance to the increase in the light-emitting area, the thickness of the light-scattering means should also be increased to have a sufficient thickness to prevent the light-scattering means from subsiding. If the light-scattering means does not have a sufficient thickness, as shown in FIG. 2, the light-scattering means subsides, so that the quantity of light is unevenly distributed.

The light-emitting portion 2, which is unlike the related art direct type and the light-guiding plate type, includes a flat type lamp opposing the display panel of the liquid crystal panel. In the flat type, however, the entire light-emitting area is not equally bright. Actually, some portions of the light-emitting area are partially dark. The dark portions are caused by the following reasons. In the liquid crystal panel above the backlight, a spacer that maintains a constant distance between the upper and lower substrates cuts off a light path. In a flat luminescent lamp, a barrier that separates adjacent light-emitting paths from each other cuts off a light path. To obtain constant luminance on the entire light-emitting area, light-scattering medium layers have to be deposited while maintaining the predetermined distance from the light-emitting area.

In view of the related art, however, the flat type fluorescent lamp has several problems. As the size of the liquid crystal panel increases, deformation of the light-scattering means occurs, and the light path from the backlight is partially cut off, thereby unevenly distributing a quantity of light. Therefore, several light-scattering medium layers having the predetermined thickness are required to obtain a thick light-scattering means, and to thereby prevent light from being unevenly distributed.

In this case, however, the luminance is low and deformation of the light-scattering means is caused due to its weight. Also, friction between the light-scattering medium layers occurs. For this reason, foreign particles are generated, thereby increasing the manufacturing cost.

SUMMARY OF THE INVENTION

In view of the above problems, a flat type fluorescent lamp according to the present invention includes a plurality of supporters that may be provided between a light-emitting portion and a light-scattering portion to uniformly maintain the distance between them regardless of a thickness of the light-scattering means to thereby obtain high luminance, and uniformly distribute a quantity of light.

A flat type fluorescent lamp according to the present invention includes a first substrate, a second substrate, a light-emitting layer formed between the first and second substrates, a plurality of supporters selectively deposited on the first substrate, and a light-scattering means formed maintaining a predetermined distance from the first substrate by the supporters.

For example, the flat type fluorescent lamp according to the present invention may include a plurality of supporters that maintain the predetermined distance between the light-emitting portion and the light-scattering means on the light-emitting area, to obtain a thin light-scattering means without deformation and subsiding of the light-scattering means. Additionally, even if the light-scattering means is thickly formed, it is possible to prevent the light-scattering means from subsiding due to its weight.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
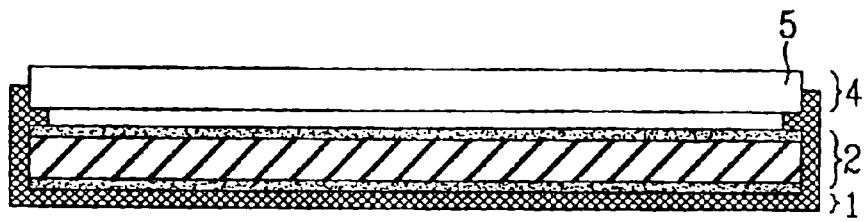
FIG. 1 is a sectional view of a related art flat type fluorescent lamp.
Figure 2:
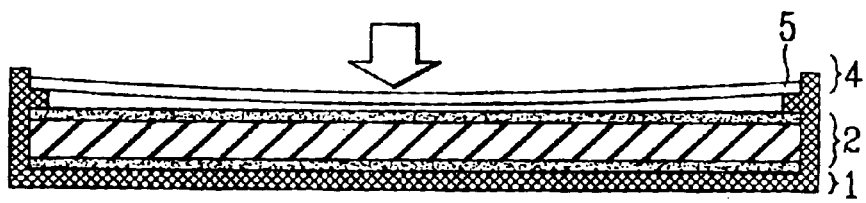
FIG. 2 is a sectional view illustrating problems of the related art flat type fluorescent lamp.
Figure 3A:
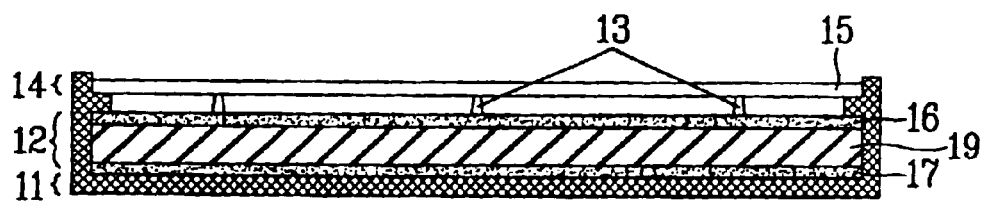
FIGS. 3A–3B are sectional views illustrating a flat type fluorescent lamp according to the present invention.

As shown in FIG. 3A, a flat type fluorescent lamp according to an embodiment of the present invention includes a reflecting portion 11, a light-emitting portion 12, a light-diffusion portion 14, and supporters 13 formed between the light-emitting portion 12 and the light-diffusion portion 14. In a liquid crystal display device, a liquid crystal panel is formed above the light-diffusion portion 14.

Figure 3B:
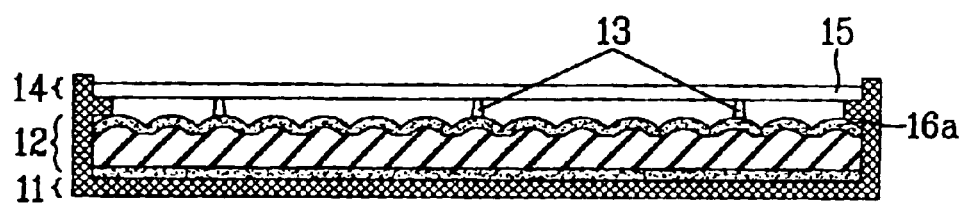

Generally, the light-emitting portion 12 includes a first substrate 16, a second substrate 17 opposing the first substrate 16, a discharge path formed on the second substrate 17, or first and second substrates 16 and 17, a cathode electrode formed on one side of the discharge path, an opposing electrode formed on the other side of the discharge path to correspond to the cathode electrode, and a discharge gas 19 charged between the first and second substrates 16 and 17. Phosphor may be deposited within the discharge path and in its inner wall to induce light-emission when the cathode electrode is electrically connected with the opposing electrode. At this time, the first substrate 16 may serve as light-emitting areas, which may be formed from a glass or heat-resistant material. The first substrate 16 may be formed in a flat shape having a plurality of supporters 13 as shown in FIG. 3A, or alternatively a first substrate 16a may be formed in a curved shape having a plurality of supporters 13 as shown in FIG. 3B.

The light-diffusion portion 14 includes a light-scattering means 15 on which one or more light-scattering medium layers may be deposited. The light-scattering means diffuses light from the lower light-emitting portion to the liquid crystal panel. The light-scattering means may be formed to distribute light uniformly and to flatten the light-emitting area. To this end, the light-scattering means may be formed by depositing light-scattering mediums of a plate material having a predetermined thickness to keep a constant distance from the first substrate 16.

Figure 4A:
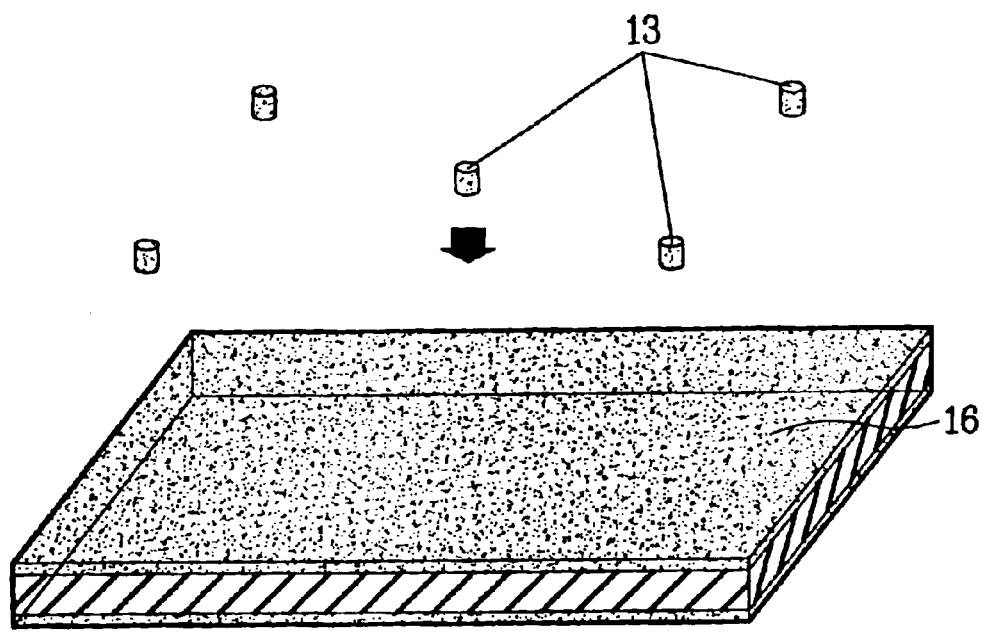
FIGS. 4A–4B are perspective views of the flat type fluorescent lamp according to an embodiment of the present invention.
Figure 4B:
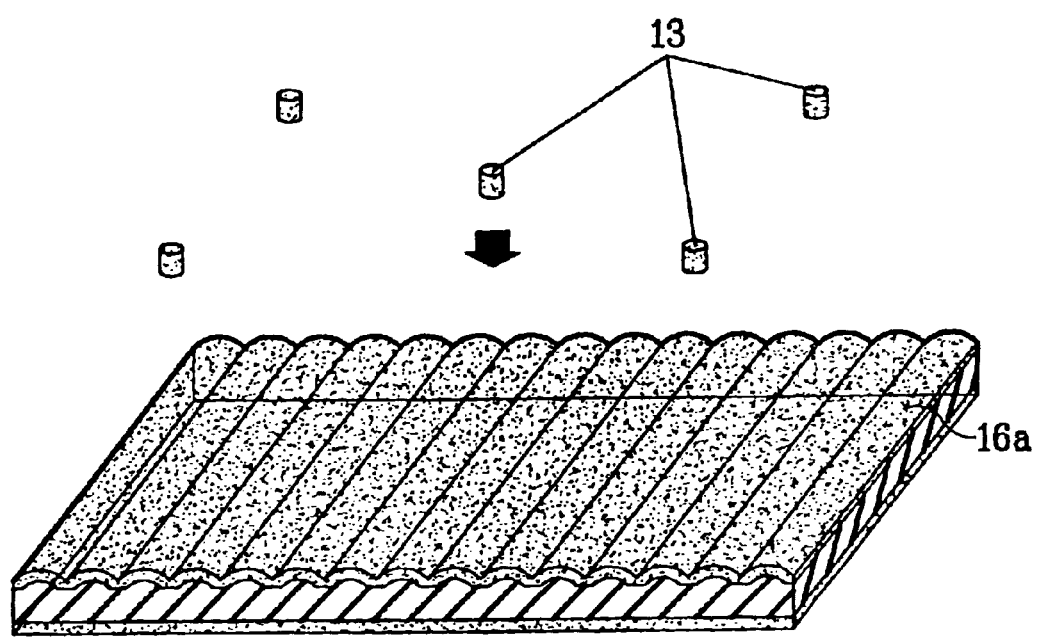

The plurality of supporters 13 may be formed on the first substrate 16 of the light-emitting portion 12 to prevent the light-scattering means 15 from subsiding. For example, as shown in FIGS. 4A–4B, separate supporters 13 may be disposed on a predetermined portion of the first substrates 16 and 16a.

Accordingly, unlike the related art, it is unnecessary to deposit more light-scattering mediums on the first substrate to prevent the light-scattering means from subsiding. Even if the light-scattering mediums are formed thickly, the supporters prevent the light-scattering means from subsiding. As a result, uniform luminance may be obtained on the entire light-emitting area for a long time because the distance between the light-emitting area and the light-scattering means is consistently maintained.

Figure 5:
FIG. 5 illustrates supporters of the present invention.

The shape of the supporters may be varied. However, the flat luminescent lamp preferably have a solid shape to form stable light-scattering mediums on an upper portion of the supporters, and to maintain a specific height for arranging the light-scattering mediums on the light-emitting area at a constant distance. For example, as shown in FIG. 5, the flat luminescent lamp has a pole shape having different upper and lower surfaces, a cylindrical or polygonal shaped pole having the same upper and lower surfaces, or a spherical shape having an upper surface cut with a curve. Also, the supporters are formed of a transparent material or materials having characteristics of scattering light, so that light generated from the flat luminescent lamp passes through a portion adjoining lower surfaces of the supporters. If light generated from the light-emitting area of the flat luminescent lamp doesn't pass through an inner portion of the supporters, the portion adjoining the supporters may become partially dark in the light-scattering mediums deposited on the flat luminescent lamp.

Figure 6A:
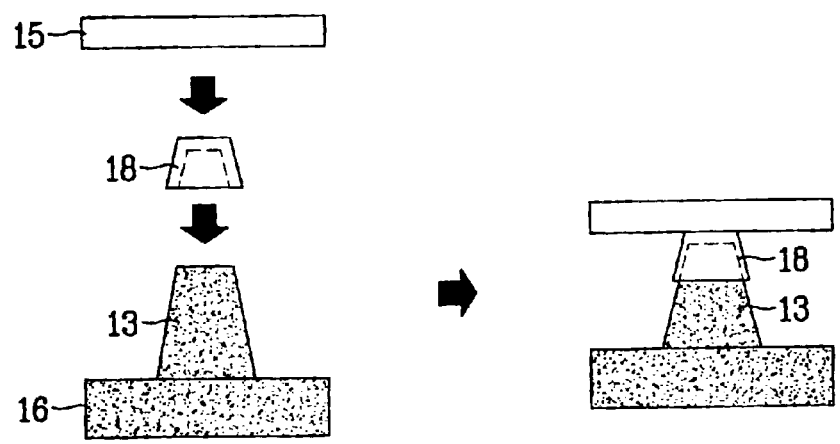
FIGS. 6A–6B are sectional views of the supporters according to the present invention.
Figure 6B:
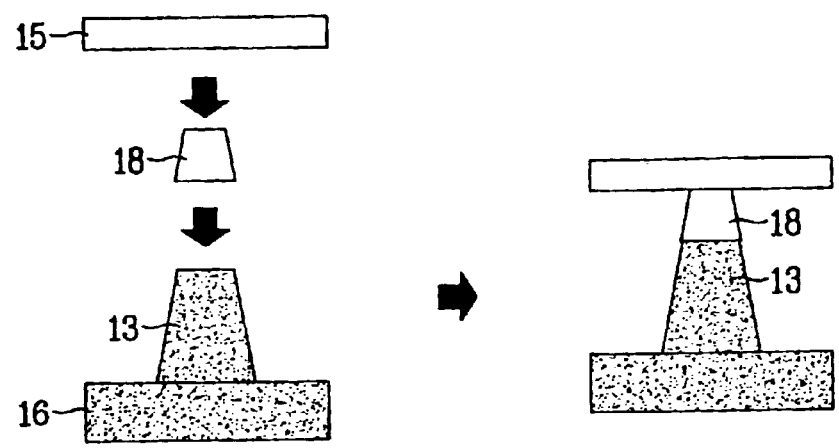
Figure 7:
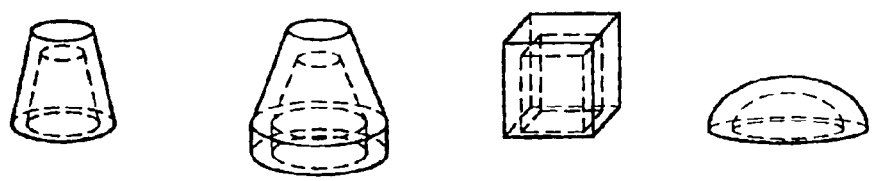
FIG. 7 illustrates a cap according to the present invention.

Furthermore, a cap 18 may be provided to prevent the supporters and the light-scattering means from being damaged from mechanical friction and pressure between the supporters and the light-scattering means above the supporters. Referring to FIG. 6A, the cap 18 may be a soft material. In addition, the cap 18 may cover the plurality of supporters 13, or be fixed to an upper portion of the supporters 13 as shown in FIG. 6B. The cap 18 may be made from various shapes as illustrated in FIG. 7.

Figure 8:
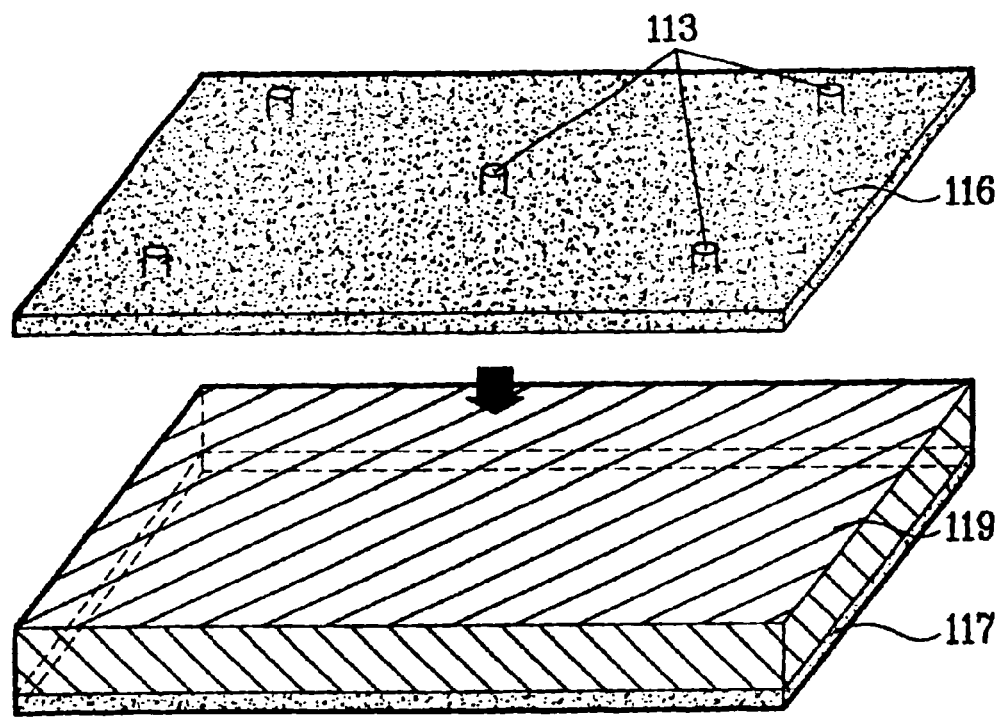
FIG. 8 is a perspective view illustrating a flat type fluorescent lamp according to another embodiment of the present invention.

Referring now to FIG. 8, the light-emitting portion will be described in detail. The light-emitting portion includes a first substrate 116 providing a plurality of supporters 113 to form a single body, a second substrate 117 opposing the first substrate 116, a discharge path formed on the second substrate 117, a cathode electrode formed on one side of the discharge path, an opposing electrode formed on the other side of the discharge path to correspond to the cathode electrode, and a discharge gas 119 charged between the first and second substrates. Phosphor may be deposited within the discharge path and in its inner wall to induce light-emission when the cathode electrode is electrically connected with the opposing electrode. At this time, the first substrate 116 may serve as light-emitting areas, which may be formed in a flat shape or curved shape having a plurality of supporters 113.

The first substrate 116 and supporters 113 may be formed of a transparent material or a heat-resistant material having a scattering light characteristic. Herein, the supporters 113 may be formed to maintain a distance between the light-scattering means deposited by one or more light-scattering medium layers and the first substrate of the light-emitting portion to prevent the light-scattering means from subsiding.

Accordingly, light-scattering medium layers having a constant thickness can be deposited without regard to the increase of the light-emitting area. In addition, uniform luminance may be obtained throughout the entire light-emitting area because the distance between the light-emitting area and the light-scattering means consistently maintained.

Furthermore, a cap may be provided to prevent the supporters and the light-scattering means from being damaged from mechanical friction and pressure between the supporters and the light-scattering means above the supporters. The height of the cap may be varied. Since the supporters have a fixed height, the height of the supporters may be adjusted higher by providing a cap. The cap may be a soft material. In addition, the cap may cover the plurality of supporters, or be fixed to an upper portion of the supporters (referring to FIGS. 6A–6B). The shapes of the supporters and cap may be varied, as illustrated in FIGS. 5–7.

The flat type luminescent lamp according to the present invention has many advantages. First, the supporters of the light-emitting area maintain a constant distance between the light-emitting area and the light-scattering means. This allows the entire light-emitting area to have a uniform luminance. In addition, the supporters support the light-scattering means. These supporters prevent the light-scattering means from subsiding into the lower portion without having to further deposit additional light-scattering mediums, even if the light-emitting area may be large. For example, the light-scattering medium may be thinly deposited without regard to increasing the light-emitting area.

Therefore, it is possible to prevent luminance from being lowered; a structure of the light-scattering means from being changed due to the weight; and friction generated by depositing a plurality of light-scattering medium layers from occurring. Accordingly, the flat type fluorescent lamp having a large size and high luminance may be provided with application to a flat light source of an LCD device.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A flat type fluorescent lamp comprising:
   first and second substrates;
   a light-emitting layer disposed between the first and second substrates;
   a plurality of supporters selectively arranged on an entire surface of the first substrate; and
   a light-scattering layer placed over the plurality of supporters, to prevent the light scattering layer from subsiding, wherein the light-scattering layer is spaced a distance from the first substrate, and wherein the light emitting layer is fluorescent.

2. The flat type fluorescent lamp as claimed in claim 1, further comprising a reflecting portion adjacent a lower portion of the second substrate.

3. The flat type fluorescent lamp as claimed in claim 1, wherein the supporters are formed of a transparent material.

4. The flat type fluorescent lamp as claimed in claim 1, wherein the supporters are formed of a material having characteristic for scattering light.

5. The flat type fluorescent lamp as claimed in claim 1, wherein the supporters are column-shaped having an upper and lower surface each with a given surface area.

6. The flat type fluorescent lamp as claimed in claim 5, wherein the surface area of the upper surface is different than the surface area of the lower surface.

7. The flat type fluorescent lamp as claimed in claim 5, wherein the surface area of the upper surface is substantially equal to the surface area of the lower surface.

8. The flat type fluorescent lamp as claimed in claim 5, wherein the supporters are cylindrical-shaped.

9. The flat type fluorescent lamp as claimed in claim 5, wherein the supporters are shaped like polygonal poles.

10. The flat type fluorescent lamp as claimed in claim 1, wherein the supporters include a lower surface having a cylindrical shape.

11. The flat type fluorescent lamp as claimed in claim 10, wherein the supporters include an upper surface that is substantially curved.

12. The flat type fluorescent lamp as claimed in claim 11, wherein the upper surface has a spherical shape.

13. The flat type fluorescent lamp as claimed in claim 1, wherein the supporters include a lower surface having a polygonal shape.

14. The flat type fluorescent lamp as claimed in claim 13, wherein the supporters include an upper surface that is substantially curved.

15. The flat type fluorescent lamp as claimed in claim 14, wherein the upper surface has a spherical shape.

16. The flat type fluorescent lamp as claimed in claim 1, wherein the supporters include an upper surface that is substantially curved.

17. The flat type fluorescent lamp as claimed in claim 16, wherein the upper surface has a spherical shape.

18. The flat type fluorescent lamp as claimed in claim 1, further comprising a cap disposed between the supporters and the light-scattering layer.

19. The flat type fluorescent lamp as claimed in claim 18, wherein the cap is formed by covering the supporters.

20. The flat type fluorescent lamp as claimed in claim 18, wherein the cap is attached to the upper portion of the supporters.

21. The flat type fluorescent lamp as claimed in claim 18, wherein the cap is formed from a soft material.

22. The flat type fluorescent lamp as claimed in claim 1, wherein the supporters are formed separately from the first substrate.

23. A flat type luminescent lamp comprising:
   a first substrate including a plurality of supporters selectively arranged on an entire surface of the first substrate to form a single body;
   a second substrate placed opposing the first substrate;
   a light-emitting layer disposed between the first and second substrates; and
   a light-scattering layer placed above the plurality of supporters, to prevent the light scattering layer from subsiding, wherein the light-scattering layer is spaced a distance from the first substrate.

* * * * *